United States Patent [19]
Morita et al.

[11] Patent Number: 6,099,629
[45] Date of Patent: Aug. 8, 2000

[54] WATER BASED INK AND WATER BASED PIGMENT INK HAVING METALLIC LUSTROUS COLOR FOR BALLPOINT PEN

[75] Inventors: Masaaki Morita, Sawa-gun; Hideaki Tomi, Sagamihara, both of Japan

[73] Assignee: Mitsubishi Pencil Kabushiki Kaisha, Tokyo, Japan

[21] Appl. No.: 09/155,668

[22] PCT Filed: Mar. 25, 1997

[86] PCT No.: PCT/JP97/00984

§ 371 Date: Sep. 28, 1998

§ 102(e) Date: Sep. 28, 1998

[87] PCT Pub. No.: WO97/35935

PCT Pub. Date: Oct. 2, 1997

[30] Foreign Application Priority Data

Mar. 27, 1996 [JP] Japan ................................. 8-072778
Apr. 10, 1996 [JP] Japan ................................. 8-088576

[51] Int. Cl.$^7$ ................................. C09D 11/02
[52] U.S. Cl. ................. 106/31.6; 106/31.65; 106/31.68; 106/31.7; 106/31.86; 106/31.95
[58] Field of Search ................. 106/31.6, 31.65, 106/31.68, 31.7, 31.86, 31.9, 31.95

[56] References Cited

U.S. PATENT DOCUMENTS 4,604,139  8/1986  Shioi et al. ............................. 106/31.6
5,474,603  12/1995  Miyashita et al. ...................... 106/31.7

FOREIGN PATENT DOCUMENTS

| | | |
|---|---|---|
| 1-56109 | 2/1982 | Japan . |
| 57-502069 | 11/1982 | Japan . |
| 58-80368 | 5/1983 | Japan . |
| 64-8673 | 4/1984 | Japan . |
| 60-186573 | 9/1985 | Japan . |
| 62-37678 | 6/1986 | Japan . |
| 2-57102 | 4/1988 | Japan . |
| 63-95277 | 4/1988 | Japan . |
| 1-501631 | 6/1989 | Japan . |
| 1-210478 | 8/1989 | Japan . |
| 2-69580 | 3/1990 | Japan . |
| 6-73323 | 3/1994 | Japan . |
| 6-192610 | 7/1994 | Japan . |
| 6-299114 | 10/1994 | Japan . |
| 6-313142 | 11/1994 | Japan . |
| 7-17872 | 3/1995 | Japan . |
| 7-70468 | 3/1995 | Japan . |
| 7-118592 | 5/1995 | Japan . |
| 7-145339 | 6/1995 | Japan . |
| 08209053 | 8/1996 | Japan . |
| 09176551 | 7/1997 | Japan . |

*Primary Examiner*—Helene Klemanski
*Attorney, Agent, or Firm*—Darby & Darby

[57] ABSTRACT

Provided is a water based ink having a metallic lustrous color using an aluminum powder for a ballpoint pen which does not allow a discharging amount to reduce and splitting to occur. This water based ink contains an aluminum paste prepared by wetting aluminum powder in advance with at least one solvent selected from glycol ethers and glycols, a thickener, a water-soluble organic solvent and water. Further, provided is a water based pigment ink having a metallic lustrous color for a ballpoint pen in which an aluminum powder and a pigment are used and which allows the colorant to provide a well developed metallic lustrous color and can be used to draw beautiful lines. This water based pigment ink contains an aluminum powder, a water-soluble organic solvent, a pigment, a thickener and a resin emulsion.

22 Claims, No Drawings

WATER BASED INK AND WATER BASED PIGMENT INK HAVING METALLIC LUSTROUS COLOR FOR BALLPOINT PEN

TECHNICAL FIELD

The present invention relates to a water based ink and a water based pigment ink having a metallic lustrous color for a ballpoint pen.

BACKGROUND ART

Disclosed in Japanese Patent Application Laid-Open No. Hei 7-145339 is a water based metallic lustrous color ink for a ballpoint pen which contains aluminum powder, natural polysaccharides, a water-soluble organic solvent and water and has a viscosity of 100 to 1500 poise and in which a ratio of a viscosity at 1 rpm to a viscosity at 10 rpm is 3.0 or more and in which a quality changes less even after storing over an extended period of time and a discharging property of the ink in a ball-rotating part of the tip of the ballpoint pen is good. Further, it is described therein that "in order to provide the line with a metallic lustrous color, aluminum powder as a colorant can be used in combination with known water-soluble dyes such as acidic dyes, basic dyes and direct dyes", but no specific examples are disclosed.

However, the ink described in preceding Japanese Patent Application Laid-Open No. Hei 7-145339 is made by blending 0.7 to 10 parts by weight of natural polysaccharides for thickening, 5 to 40 parts by weight of a water-soluble organic solvent and 2 to 15 parts by weight of aluminum powder. That is, consideration is given so that aluminum powder is prevented from settling by limiting the content of the natural polysaccharides for thickening, but sometimes the discharging amount is little and sometimes splitting (an amount of ink in a part where the ball contacts a paper face is so little as to cause the ink to stay only at both sides thereof and therefore the line looks two) is liable take place. Accordingly, the ink has a problem in terms of practical use.

Further, disclosed in Japanese Patent Application Laid-Open No. Hei 2-69580 is a low viscosity water based metallic color ink containing a resin emulsion, in which dispersed is a paste of an aluminum powder pigment of which surface is wetted with a solvent of a hydrocarbon mixed with an ester based wax for rust-prevention. Disclosed in Japanese Patent Application Laid-Open No. Hei 6-313142 is a water based metallic lustrous color ink using a water-soluble dye, in which the content of an inorganic salt has been set to 0.5% by weight or less. Disclosed in Japanese Patent Application Laid-Open No. Sho 63-95277 is a water based metallic color ink containing an aluminum powder pigment, an amphoteric compound, a resin emulsion, water, an organic pigment and a metallic soap. Disclosed in Japanese Patent Application Laid-Open No. Sho 58-80368 is a water based metallic color ink for writing instruments containing an aluminum powder pigment, an acrylic resin emulsion, a polyvinyl alcohol and/or cellulose based water-soluble resin and a water-dispersed type pigment.

Disclosed in Japanese Patent Application Laid-Open No. Hei 6-192610 is a water based ink composition for writing instruments containing an aluminum pigment, a water-soluble organic solvent and a perfluoroalkylphosphoric ester and/or a perfluoroalkyltrimethylammonium salt.

The ink disclosed in Japanese Patent Application Laid-Open No. Hei 6-313142 mentioned above reveals a colored metallic lustrous color by using a water-soluble dye as a colorant. However, a dye penetrates into fibers of paper when the viscosity is lower than that of the ink composition for a ballpoint pen shown in Example 2, so that the dye draws outlines around the lines of the metal powder pigment, or a colored metallic lustrous color having a sufficient intensity is not obtained, and therefore the lines tend to become drawn lines close to a silver color. When a water based colored metallic color ink was actually prepared by using aluminum powder in combination with corresponding amounts of a thickener and a colorant (yellow pigment), it was found that the ink presented a beautiful golden color and that in actual writing, a colored metallic color was developed on a paper face which scarcely absorbs an ink, such as coated paper. On the other hand, when writing was carried out on a normal paper face (absorbent paper), particularly a colored paper face (absorbent paper), it was found that a colored metallic lustrous color was displayed immediately after writing. However, there was a problem that the drawn lines were finally turned close to a silver color due to fading of the color which was supposed to be caused by settling of the yellow pigment. Considered as a method for solving this problem is the method of adding a large amount of a color pigment to raise a viscosity of the ink to thereby delay a settling rate of the pigment. However, there occurs a problem in terms of storage stability or there is a problem such that stable discharge of the ink from the pen tip cannot be obtained.

Further, inks for low viscosity markers and felt tip pens using pigments as colorants are disclosed in Japanese Patent Application Laid-Open No. Sho 58-80368, Japanese Patent Application Laid-Open No. Sho 63-95277 and Japanese Patent Application Laid-Open No. Hei 2-69580 each described above. Those inks contain resin emulsions also as an essential component. However, the emulsions are used for a principal purpose of providing the drawn lines with a sticking property. For this purpose, a film-forming emulsion is used and blended in a large amount.

However, when this film-forming emulsion is used for paint markers, which use a so-called porous pen core for a pen tip and a valve mechanism for an ink tank, and which are capable of supplying a lot of an ink to the pen core at any time, there are scarcely problems. However, when it is used particularly for a ballpoint pen, a water based ballpoint pen in which a space of a flow pass in a ball tip part is small have easily a reduction in a flowing amount due to dry up at the pen tip and inferior writing because of a film-forming effect of the emulsion.

Further, it is described that the ink shown in Japanese Patent Application Laid-Open No. Hei 6-192610 described above can use known water-soluble dyes, organic pigments and inorganic pigments, but no specific examples are disclosed.

Accordingly, an object of the present invention is to provide a water based ink having a metallic luster for a ballpoint pen using aluminum powder blended with a thickener in a suitable amount, in which a reduction in the flowing amount and splitting are not brought about.

Further, an object of the present invention is to provide a water based pigment ink having a metallic lustrous color for a ballpoint pen containing aluminum powder and water-soluble organic solvent, in which a metallic lustrous color having good color development of the pigment is obtained as well in writing on an absorbent paper usually used, particularly a colored absorbent paper and beautiful lines can be drawn and in which a reduction in the flowing amount of the ink is scarcely brought about.

DISCLOSURE OF THE INVENTION

The water based ink having a metallic lustrous color for a ballpoint pen of the present invention comprises a thickener, a water-soluble organic solvent, water and an aluminum paste prepared by wetting aluminum powder in advance with at least one solvent selected from glycol ethers and glycols. This allows the dispersibility of the aluminum powder to be improved, beause at least one solvent selected from glycol ethers and glycols is freely miscible with water which is the principal solvent. Therefore, the aluminum powder is evenly dispersed in an ink vehicle containing the thickener and the other components, so that splitting is prevented. In addition, the ink flows out suitably from the pen tip of a ballpoint pen, and the good writing performance is shown.

Further, the water based pigment ink having a metallic lustrous color for a ballpoint pen of the present invention comprises aluminum powder, a water-soluble organic solvent, a pigment, a thickener and a resin emulsion. The resin emulsion is charged into the inside of paper fibers and allows a beautiful colored lustrous color (metallic color) to be revealed by virtue of its filling action of inhibiting the color pigment from settling as is the case with writing on a paper face which scarcely absorbs an ink, such as a coated paper.

BEST MODE FOR CARRYING OUT THE INVENTION

The water based ink having a metallic lustrous color for a ballpoint pen according to the present invention shall be explained below in detail.

The aluminum paste used for the water based ink of the present invention is prepared by wetting aluminum powder with at least one solvent selected from glycol ethers and glycols. An aluminum content in the aluminum paste is 40 to 90% by weight.

Products subjected to rust prevention treatment so that they can be used for water based inks are preferred as the aluminum powder, and preferred are products obtained by treating with, for example, phosphoric esters, phosphates and phosphides, vanadates, chromium compounds and dimeric acids, or products encapsulated with inorganic or organic protective film (polymer) coats.

The aluminum paste prepared by subjecting the aluminum powder to wetting treatment with a glycol ether or a glycol includes as commercial products, for example, STAPA HYDROLAC PM2, PM8, PM2n.l., PM8n.l., PM16n.l., PM60n.l., PM65n.l., PM24n.l., BG2, BG8, BG2n.l., BG8n.l., BG16n.l., BG60n.l., BG65n.l. and BG24n.l., and STAPA HYDROLAC PM CHROMAL I, II, IV, VIII and X (all manufactured by ECKART Co., Ltd.).

The content of the aluminum paste in the ink is preferably 1 to 15% by weight based on the whole amount of the ink in terms of an amount converted to powder. When the content is less than 1% by weight, the lines have poor metallic luster, and when the content exceeds 15% by weight, an adverse effect comes to be exerted on discharge of a fixed amount of the ink.

The thickener used for the water based ink of the present invention is used in order to prevent the aluminum powder from settling and to obtain a viscosity suited to a water based ink for a ballpoint pen. Though the kind thereof is not specifically restricted, desired are products which scarcely bring about a change in the viscosity with the passage of time and have a high thickening effect in the water based ink using the aluminum pigment. For example, water-soluble natural polymers produced by a microbiological fermentation method can be given. To be specific, KELZAN, do. AR, T and S, KELTROL, do F, T and K9A48 as xanthan gum, KIA96 as welan gum, KIA 112 and K7C233 as rhamsan gum, KELCOGEL as gellan gum, and RHEOZAN, MEY-POLY as other fermented gums (all available from Sansho Co., Ltd.), and guar gum and its derivatives, and in addition thereto, HIVISWAKO 103, 104 and 105 as cross-linking type acrylic acid polymers (all available from Wako Pure Chemical Industries, Ltd.) can be used, and further clay minerals such as silica, magnesium aluminum silicate, bentonite and hectorite can be used in combination with those natural and synthetic polymers.

The content of the thickener in the ink is preferably 0.4 to 1.0% by weight based on the whole amount of the ink. When the content is less than 0.4% by weight, the thickener does not sufficiently display an effect of inhibiting the aluminum powder from settling and the ink becomes unsuitable for use in a ballpoint pen. On the other hand, when the content exceeds 1.0% by weight, the discharging amount of ink is reduced, so that the color is not sufficiently developed.

The water-soluble organic solvent used for the water based ink of the present invention is added in order to improve qualities required for the ink for a ballpoint pen, for example, prevention of dry up at the pen tip and antifreezing of the ink at low temperatures and improvement in smoothness of writing. To be specific, there can be used glycols such as ethylene glycol, diethylene glycol, triethylene glycol, propylene glycol, polyethylene glycol, 1,3-butylene glycol, glycerin, diglycerin and derivatives thereof.

Can suitably be added, if necessary, is sequestering agents, pH controllers, dispersion aids, sticking agents, defoaming agents, surfactants, preservatives, fungicides, rust preventives, color pigments, coloring dyes, emulsions and latices.

Water is used as a principal solvent, and pH in the whole ink is set preferably to about 7.

The aluminum paste used for the water based ink having a metallic lustrous color for a ballpoint pen comprises at least the aluminum powder wetted in advance with glycol ether or glycol, and this glycol ether or glycol is freely miscible with water which is the principal solvent, so that the aluminum powder has the good dispersibility and hence is homogeneously dispersed in the ink vehicle containing the thickener and the other components. Accordingly, it is presumed that the discharging amount of the ink from the pen tip of the ballpoint pen is suitable and splitting is prevented.

The water based pigment ink having a metallic lustrous color for a ballpoint pen according to the present invention shall be explained below in detail.

Products subjected to rust prevention treatment so that they can be used for water based inks are preferred as the aluminum powder used for the water based pigment ink of the present invention, and preferred are products obtained by treating with, for example, phosphoric esters, phosphates and phosphides, vanadates, chromium compounds and dimeric acids, or products encapsulated with inorganic or organic protective film (polymer) coats.

The aluminum powder used for the water based pigment ink of the present invention is used preferably in the form of an aluminum paste, and those prepared by wetting aluminum powder with at least one solvent selected from glycol ethers and glycols are particularly preferred. An aluminum content in the aluminum paste is 40 to 90% by weight.

To be specific, the commercial products include STAPA HYDROLAC PM2, PM8, PM2n.l., PM8n.l., PM16n.l., PM60n.l., PM65n.l., PM24n.l., BG2, BG8, BG2n.l., BG8n.l., BG16n.l., BG60n.l., BG65n.l. and BG24n.l., and STAPA HYDROLAC PM CHROMAL I, II, IV, VIII and X (all manufactured by ECKART Co., Ltd.), and other products include 0500M, WB010, WB0230, 1500MA, 1539NA, WB1130 and WX1130 (all manufactured by TOYO ALUMINIUM K.K.), and AW-600, 500B, 520B, 666C, 808C, 7000R, 50F and 21G (all manufactured by Asahi Kasei Metals Co., Ltd.).

The content of the aluminum paste in the ink is preferably 1–15% by weight based on the whole amount of the ink in terms of an amount converted to powder. When the content is less than 1% by weight, the lines have a poor metallic lustrous color, and when the content exceeds 10% by weight, an adverse effect comes to be exerted on discharge of a fixed amount of the ink and thus a strong silver color is developed, so that an impression of the colored metallic lustrous color is not good. Incidentally, when a leafing type (a type in which aluminum particles are disposed parallel on a coated surface layer) of an aluminum powder is used, it is desirable that the degree of leafing is suitably controlled by fatty acid soap or other surfactants.

The component resins of the resin emulsion used in the present invention shall not specifically be restricted and are preferably the following ones. They include, for example, polymethyl methacrylate, styrene-butadiene copolymers, styrene-acryl copolymers, styrene-(meth)acrylate copolymers, polyvinyl chloride resins, polystyrene, vinylpyridine copolymers, polychloroprene, polyisoprene, polyurethane, polyesters, epoxy resins, melamine resins, acryl resins, benzoguanamine resins and polyvinyl acetate.

Included as well in these polymers are resins obtained by modifying the polymers described above with trace components by graft polymerization and cross-linking, the names of which are prefixed by "modified", "cross-linking type" and "self cross-linkable type".

To be specific, commercial products include Nipol LX303 and LX382 manufactured by Nippon Zeon Co., Ltd. as styrene-butadiene copolymer emulsions, G151 manufactured by Nippon Zeon Co., Ltd. as polyvinyl chloride, MH5055 manufactured by Nippon Zeon Co., Ltd., SX863, SX864 and SX865 manufactured by Japan Synthetic Rubber Co., Ltd., OP-62 and OP-84J manufactured by Rohm & Haas Co., Ltd., Microgel E-2002, E-5001, E-5002, E-1001, E-1002, E-3101 and E-6000 manufactured by NIPPON PAINT CO., LTD., and MOWINYL 749J, 749S, 871, 970 and 972 manufactured by Hoechst Gosei Co., Ltd. as styrene-acryl copolymers and styrene-(meth)acrylate copolymers, and J-790 and J-780 manufactured by Johnson Polymer Co., Ltd., Experimental Emulsion E-357 and E-1630 and Primal B-85, WL-51, WL-71, WL-81, WL-91, WL-93, B-88 and NTS-2923 manufactured by Rohm & Haas Co., Ltd., T-371 manufactured by Japan Synthetic Rubber Co., Ltd., MOWINYL 742N manufactured by Hoechst Gosei Co., Ltd., and MP series manufactured by Soken Chemical Co., Ltd. as poly(meth)acryls.

The resin emulsion used for the water based pigment ink of the present invention has an average particle diameter falling preferably in a range of 0.03 to 0.6 μm, more preferably 0.08 to 0.6 μm. When the average particle diameter is less than 0.03 μm, the emulsion is freely absorbed into a absorbent paper face, and a filling effect of preventing the pigment from penetrating into the inside of the paper face is hardly displayed. On the other hand, when the average particle diameter exceeds 0.6 μm, the emulsion stays in a condition in which the emulsion is scarcely absorbed (to be difficult to pass through gaps between fibers of paper) into a paper face of absorbent paper, and further, a problem comes to occur in discharging a ballpoint pen ink. As a result, a filling effect of preventing the pigment from penetrating into the inside of a paper face is hardly displayed as is the case with an average particle diameter of less than 0.03 μm.

Further, the resin emulsion used for the water based pigment ink of the present invention has preferably no film-forming property at room temperature and has preferably a high Tg. A minimum film-forming temperature means a temperature shown in a boundary between a uniform continuous film part and a cloudy part, wherein the emulsion is applied to a stainless steel plate of a temperature gradient test apparatus in a thickness of 0.3 mm and the condition of the film is observed after dryed (with silica gel) hermetically.

If the emulsion having a film-forming property at room temperature, that is, the emulsion having a minimum film-forming temperature of lower than 40° C. is used, imparted to the drawn lines is a sticking property by virtue of a film-forming action thereof, but when it is used for an ink for a ballpoint pen, a reduction in the discharging amount of the ink due to drying at the pen tip and inferior writing are likely to occur because of the sticking property, and therefore the emulsion is unsuited for use as an ink for a ballpoint pen.

When the resin emulsion used for the water based pigment ink of the present invention uses an emulsifier, the emulsifier has to be suitably selected so that an adverse effect is not exerted on the thickener and the dispersed color pigment each of which shall be described later.

Further, the ink which is excellent in settling stability and storage stability can be provided as well by selecting an emulsion having a low specific gravity containing hollow particle.

The resin emulsion used for the water based pigment ink of the present invention having no film-forming property at room temperature is contained preferably in an amount of 1 to 10% by weight in terms of a solid content. When the resin emulsion having a minimum film-forming temperature of room temperature or lower is used, it can be used in an amount of 5% by weight or less in terms of a solid content.

The resin emulsions having different physical properties such as Tg can freely be selected according to purposes; for example, the ink is provided with a sticking property by using an emulsion having a low Tg; and the ink which scarcely exerts an adverse effect on dry up caused by drying at the pen tip can be provided by using the emulsion having a high Tg because of less film-forming ability. Further, the ink which is excellent in settling stability and storage stability can be provided as well by selecting a latex emulsion containing hollow particles having a low specific gravity.

The thickener used for the water based pigment ink of the present invention is used in order to prevent the aluminum powder from settling and obtain a viscosity suited to an ink for a ballpoint pen. Though the kind thereof is not specifically restricted, preferred are the thickeners which scarcely cause a change in a viscosity with the passage of time and have a high thickening effect in the water based pigment ink using the aluminum powder.

In particular, products which are reduced in a viscosity of the ink by shearing brought about with rotation of the ball (pen tip) are preferred as the thickener mainly used. They include, for example, water-soluble natural polymers produced by a microbiological fermentation method. To be specific, KELZAN, do. AR, T and S, KELTROL, do. F and T and K9A48 as xanthane gum, KIA96 as welan gum, KIA112 and K7C233 as rhamsan gum, KELCOGEL as gellan gum, and RHEOZAN, MEYPOLY as other fermented gums (all available from Sansho Co., Ltd.), guar gum and its derivatives, and in addition thereto, HIVISWAKO 103, 104 and 105 as cross-linking type acrylic acid polymers (all available from Wako Pure Chemical Industries, Ltd.). Further, clay minerals such as silica, magnesium aluminum silicate, bentonite and hectorite can be used in combination with those natural and synthetic polymers.

The content of the thickener in the ink is preferably 0.4 to 1.0% by weight based on the whole amount of the ink. When the content is less than 0.4% by weight, the thickener does not sufficiently display an effect of inhibiting the aluminum powder from settling, and the ink becomes unsuitable for use in a ballpoint pen. On the other hand, when the content exceeds 1.0% by weight, the discharging amount of ink is reduced, so that the color is not sufficiently developed.

Solvents which have so far been used for water based pigment inks are used as the water-soluble organic solvent for the ink of the present invention. To be specific, they can include glycols such as ethylene glycol, diethylene glycol, triethylene glycol, propylene glycol, polyethylene glycol, 1,3-butylene glycol, glycerin, diglycerin and derivatives thereof. These solvents show an effect of improving qualities required for the ink for a ballpoint pen, for example, prevention of dry up at the pen tip and antifreezing of the ink at low temperatures, and an improvement in the writing smoothness.

The content of the water-soluble organic solvent in the ink is preferably 5 to 40% by weight based on the whole amount of the ink. When the content is less than 5% by weight, the effects such as prevention of dry up at the pen tip and antifreezing of the ink at low temperatures, and an improvement in the writing smoothness are not sufficiently displayed, and the ink is unsuited to use for a ballpoint pen. On the other hand, when the content exceeds 40% by weight, the discharging amount of ink is reduced, the color is not sufficiently developed and it takes longer time for the drawn lines to dry.

The color pigment used for the water based pigment ink of the present invention can freely be selected from known pigments which have so far been used for water based pigment inks. These pigments are dispersed preferably by means of a paint shaker or a bead mill in a system in which the resin, the surfactant, the solvent and the like are added in advance, or preferably used in the form of a toner in which a processed pigment (the pigment with a resin and a surfactant adsorbed) is dispersed with stirring. The pigment used has preferably an average particle diameter falling in a range of 0.03 to 0.3 μm. When the average particle diameter is less than 0.03 μm, the pigment particles are easily absorbed freely into a paper face of absorbent paper, and a penetration-preventing effect produced by a filling effect of the emulsion is hardly exhibited enough. On the other hand, when the average particle diameter exceeds 0.3 μm, the dispersion stability of the toner itself is usually deteriorated, and therefore an adverse effect is liable to be exerted as well on the ink to which the toner is added.

The content of the pigment in the ink is preferably 0.5 to 15% by weight based on the whole amount of the ink. When the content is less than 0.5% by weight, the color of the pigment is insufficiently developed, and it is difficult to obtain colored metallic luster. On the other hand, when the content exceeds 15% by weight, the color of the pigment is too intensely developed, and therefore the lines having a poor lustrous quality are drawn.

Can suitably be added, if necessary, is sequestering agents, pH controllers, dispersion aids, sticking agents, defoaming agents, surfactants, preservatives, fungicides and rust preventives.

Water is used as the principal solvent, and pH in the whole ink is set preferably to about 7.

The color pigment is prevented from penetrating into a paper face in excess by a filling effect produced by allowing the resin emulsion used for the water based pigment ink having a metallic lustrous color for a ballpoint pen to penetrate into an absorbent face and to be charged into gaps between fibers of paper. Accordingly, it is presumed that the aluminum powder and the color pigment are present efficiently on a paper face, so that a beautiful metallic lustrous color is presented.

EXAMPLES

The present invention shall be explained below with reference to examples.

Example 1

| Silver ink: | |
|---|---|
| Aluminum paste "STAPA HYDROLAC PM Chromal VIII" [manufactured by ECKART Co., Ltd.; aluminum powder content: about 70% by weight (containing propylene glycol monomethyl ether as a solvent)] | 14 parts by weight |
| Water | 40.2 parts by weight |
| Propylene glycol | 12 parts by weight |
| Glycerin | 3 parts by weight |
| Thickener 2% aqueous solution of "Rheozan" (brand name, manufactured by Sansho Co., Ltd.) | 30 parts by weight |
| Preservative "Hokucide N100" (brand name, manufactured by Hokko Chemical Industry Co., Ltd.) | 0.15 part by weight |
| Rust Preventive: benzotriazole | 0.2 part by weight |
| Sequestering agent "Zonon D" (brand name, manufactured by Daiichi Kagaku Yakuhin Co., Ltd.) | 0.3 part by weight |
| 2-Amino-2-methyl-1-propanol "AMP-90" (brand name, manufactured by ANGUS Chemical Company, Ltd. (containing about 10% of water) | 0.15 part by weight |

The components other than the thickener out of the respective components described above were mixed for one hour by means of a labo mixer, and then the thickener prepared in advance in the form of a 2% aqueous solution was added, followed by stirring and mixing again for one hour, whereby an ink having a viscosity of 3200 centipoise (E type viscometer, 1 rpm, 25° C.) and a pH of 7.2 was obtained.

Example 2

| Golden ink: | |
|---|---|
| Aluminum paste "STAPA HYDROLAC BG8n.1." [manufactured by ECKART Co., Ltd.; aluminum powder content: about 70% by weight (containing water and butyl glycol as solvents)] | 5 parts by weight |

-continued

Golden ink:

| | |
|---|---|
| Water | 26.7 parts by weight |
| Thickener | 25 parts by weight |
| Xanthan gum; 2% aqueous solution of "Keltrol" (brand name, manufactured by Sansho Co., Ltd.) | |
| Ethylene glycol | 15 parts by weight |
| Preservative | 0.15 part by weight |
| "Hokucide N100" (brand name, manufactured by Hokko Chemical Industry Co., Ltd.) | |
| Rust preventive: benzotriazole | 0.2 part by weight |
| Sequestering agent | 0.15 part by weight |
| "Zonon D" (brand name, manufactured by Daiichi Kagaku Yakuhin Co., Ltd.) | |
| 2-Amino-2-methyl-1-propanol | 0.1 part by weight |
| "AMP-90" [brand name, manufactured by ANGUS Chemical Company, Ltd. (containing about 10% of water)] | |
| Acrylic emulsion | 7 parts by weight |
| "Johncryl J-7001" (Johnson Polymer Co., Ltd., solid content: 42%) | |
| Yellow pigment toner | 20 parts by weight |
| (aqueous toner dispersed with acryl resin, containing 15% of "C.I. Pigment Yellow 137") | |
| Red pigment toner | 0.7 part by weight |
| (aqueous toner dispersed with acryl resin, containing 15% of "C.I. Pigment Red 17") | |

The respective color pigment toners described above were obtained by dispersing the prescribed amounts of the components for about 30 minutes by means of a bead mill. The pigments obtained by dispersing had an average particle diameter of about 100 to 200 nm.

The components other than the thickener out of the respective components described above were stirred and mixed for one hour by means of a labo mixer, and then the thickener prepared in advance in the form of a 2% aqueous solution was added, followed by stirring and mixing again for one hour, whereby an ink having a viscosity of 3000 centipoises (E type viscometer, 1 rpm, 25° C.) and a pH of 7.1 was obtained.

Comparative Example 1

An ink was prepared in the same composition as in Example 1, except that the aluminum paste was replaced with "AW-600" (manufactured by Asahi Kasei Metals Co., Ltd., containing 69% by weight of aluminum powder and in addition thereto, containing water and mineral spirits).

Comparative Example 2

An ink was prepared in the same composition as in Example 2, except that 5 parts by weight of the aluminum paste used in Example 2 was replaced with "WB1130" (manufactured by TOYO ALUMINIUM K.K., containing 67% by weight of aluminum powder and in addition thereto, containing mineral spirits).

The writing performances of the water based inks obtained in Examples 1 and 2 and Comparative Examples 1 and 2 were tested by the following method.

The respective inks were charged into polypropylene holder refills (UMR-5) of ballpoint pens "UM-100" manufactured by MITSUBISHI PENCIL CO., LTD. to produce ballpoint pens for evaluation through a prescribed assembly procedure.

A 0.7 mm ball tip was used for the pen tip, and the pen tip obtained by enlarging the respective clearances of the ball, the holder and the channel for a high viscosity was used.

Spirals having a diameter of about 2 cm were drawn on wood free paper (JIS P32012 writing paper A) by handwriting at a writing angle of about 60° by means of the ballpoint pens for evaluation described above.

In this case, the writing speed was set up to approximately three levels [writing ¼ spiral per second (slow), writing 1 spiral per second (standard) and writing 2 spirals per second (fast)].

The writing performances of the drawn lines were evaluated according to the following criteria:

⊚: capable of writing well

○: no starving and splitting observed and capable of writing (a little small discharging amount of ink)

Δ: starving caused (small discharging amount of ink)

▲: splitting caused (small discharging amount of ink)

X: impossible to write

The test results are shown in Table 1.

TABLE 1

| | Writing performance | | |
|---|---|---|---|
| | ①* | ②* | ③* |
| Example 1 | ⊚ | ⊚ | ⊚ |
| Example 2 | ⊚ | ⊚ | ⊚ |
| Comparative Example 1 | Δ | ▲ | ▲ |
| Comparative Example 2 | Δ | ▲ | ▲ |

*Writing speed:
① ¼ spiral/second
② 1 spiral/second
③ 2 spirals/second

It can be found from the results obtained in Examples 1 and 2 that when the aluminum pastes wetted with the solvent selected from glycol ethers and glycols were used, the amount of the ink discharged from the tip of the ballpoint pen is optimized even at a fast writing speed as is the case with the slow writing speed and that starving and splitting do not occur.

In contrast with this, it can be found that when the conventional aluminum pastes wetted with mineral spirits which is not soluble in water as shown in Comparative Examples 1 and 2 were used, the amount of the ink discharged from the tip of the ballpoint pen is small and thus starving occurs in the drawn lines even when the writing speed is slow.

The respective color pigment toners used in the following examples were obtained by dispersing the prescribed amounts of the components for about 30 minutes by means of a bead mill. The pigments obtained by dispersing had an average particle diameter of about 100 to 200 nm.

Example 3

Golden ink:

| | |
|---|---|
| Aluminum paste | 3 parts by weight |
| "STAPA HYDROLAC PM Chromal VIII" [manufactured by ECKART Co., Ltd.; aluminum powder content: about | |

-continued

Golden ink:

| | |
|---|---|
| 70% by weight (containing propylene glycol monomethyl ether as a solvent)] | |
| Purified water | 11.5 parts by weight |
| Propylene glycol | 12 parts by weight |
| Glycerin | 3 parts by weight |
| Thickener 2% aqueous solution of "Rheozan" (brand name, manufactured by Sansho Co., Ltd.) | 30 parts by weight |
| Preservative "Hokucide N100" (brand name, manufactured by Hokko Chemical Industry Co., Ltd.) | 0.15 part by weight |
| Rust preventive: benzotriazole | 0.2 part by weight |
| Sequestering agent "Zonon D" (brand name, manufactured by Daiichi Kagaku Yakuhin Co., Ltd.) | 0.3 part by weight |
| 2-Amino-2-methyl-1-propanol "AMP-90" (brand name, manufactured by ANGUS Chemical Company, Ltd.; containing about 10% of water) | 0.15 part by weight |
| Acrylic emulsion "Johncryl J-780" (brand name, manufactured by Johnson Polymer Co., Ltd.; solid content: 42%; average particle diameter: 0.1 μm; minimum film-forming temperature: 50° C. or higher) | 19 parts by weight |
| Yellow pigment toner (aqueous toner dispersed with acryl resin, containing 15% of C.I. Pigment Yellow 137) | 20 parts by weight |
| Red pigment toner (aqueous toner dispersed with acryl resin, containing 15% of C.I. Pigment Red 17) | 0.7 part by weight |

The respective color pigment toners described above were obtained by dispersing the prescribed amounts of the components for about 30 minutes by means of a bead mill. The pigments contained in these pigment toners had an average particle diameter of about 100 to 200 nm.

The components other than the thickener out of the respective components described above were stirred and mixed for one hour by means of a labo mixer, and then the thickener prepared in advance in the form of a 2% aqueous solution was added, followed by stirring and mixing again for one hour, whereby an ink having a viscosity of 3300 centipoises (E type viscometer, 1 rpm, 25° C.) was obtained.

Example 4

Blue metallic ink:

| | |
|---|---|
| Aluminum paste "STAPA HYDROLAC BG8n.1." [manufactured by ECKART Co., Ltd.; aluminum powder content: about 70% by weight (containing butyl glycol as a solvent)] | 5 parts by weight |
| Purified water | 25.9 parts by weight |
| Ethylene glycol | 15 parts by weight |
| Thickener 2% aqueous solution of "Keltrol" (brand name, manufactured by Sansho Co., Ltd.) | 25 parts by weight |
| Preservative "Hokucide N100" (brand name, manufactured by Hokko Chemical Industry Co., Ltd.) | 0.15 part by weight |

-continued

Blue metallic ink:

| | |
|---|---|
| Rust preventive: benzotriazole | 0.2 part by weight |
| Sequestering agent "Zonon D" (brand name, manufactured by Daiichi Kagaku Yakuhin Co., Ltd.) | 0.15 part by weight |
| 2-Amino-2-methyl-1-propanol "AMP-90" (brand name, manufactured by ANGUS Chemical Company, Ltd.; containing about 10% of water) | 0.1 part by weight |
| Potash soap A (manufactured by Kyoeisha Chemical Co., Ltd.) | 0.5 part by weight |
| Cross-linking type styrene-acryl emulsion "SX-860" (brand name, manufactured by Japan Synthetic Rubber Co., Ltd.; solid content: 40%; average particle diameter: 0.50 μm; no film-forming ability at room temperature) | 8 parts by weight |
| Blue pigment toner (aqueous toner dispersed with acryl resin, containing 15% of "C.I. Pigment Blue 15") | 20 parts by weight |

The blue pigment toner described above was obtained by dispersing the prescribed amounts of the components for about 30 minutes by means of a bead mill. The pigments obtained by dispersing had an average particle diameter of about 100 to 200 nm.

The components other than the thickener out of the respective components described above were stirred and mixed for one hour by means of a labo mixer, and then the thickener prepared in advance in the form of a 2% aqueous solution was added, followed by stirring and mixing again for one hour, whereby an ink having a viscosity of 3200 centipoises (E type viscometer, 1 rpm, 25° C.) was obtained.

Example 5

Green metallic ink:

| | |
|---|---|
| Aluminum paste "WX1130" [(manufactured by TOYO ALUMINIUM K.K.; aluminum powder content: about 56% by weight (containing mineral spirits and isopropyl alcohol as solvents)] | 9 parts by weight |
| Purified water | 14 parts by weight |
| Propylene glycol | 15 parts by weight |
| Thickener 1% aqueous solution of "HIVISWAKO 105" (manufactured by Wako Pure Chemical Industries, Ltd.) | 45 parts by weight |
| Preservative "Hokucide N100" (brand name, manufactured by Hokko Chemical Industry Co., Ltd.) | 0.15 part by weight |
| Rust preventive: benzotriazole | 0.2 part by weight |
| Sequestering agent "Zonon D" (brand name, manufactured by Daiichi Kagaku Yakuhin Co., Ltd.) | 0.15 part by weight |
| 2-Amino-2-methyl-1-propanol "AMP-90" (brand name, manufactured by ANGUS Chemical Company, Ltd.; containing about 10% of water) | 0.1 part by weight |
| Styrene-acryl emulsion "ROPAQUE HP-91" (brand name, manufactured by Rohm & Haas Co., Ltd.; solid content: 53%; average particle diameter: 1 μm; no film-forming | 6 parts by weight |

-continued

Green metallic ink:

| | |
|---|---|
| ability at room temperature) | |
| Blue pigment toner | 0.4 part by weight |
| (aqueous toner dispersed with | |
| acryl resin, containing 15% of | |
| "C.I. Pigment Blue 15") | |
| Yellow pigment toner | 10 parts by weight |
| (aqueous toner dispersed with | |
| acryl resin, containing 15% of | |
| "C.I. Pigment Yellow 137") | |

The components other than the thickener out of the respective components described above were stirred and mixed for one hour by means of a labo mixer, and then the thickener prepared and neutralized in advance in the form of a 1% aqueous solution was added, followed by stirring and mixing again for one hour, whereby an ink having a viscosity of 2500 centipoises (E type viscometer, 1 rpm, 25° C.) was obtained.

Example 6

Purple metallic ink:

| | |
|---|---|
| Aluminum paste | 3 parts by weight |
| "AW-808" [(brand name, manufactured | |
| by Asahi Kasei Metals Co., Ltd.; | |
| aluminum powder content: about 72% | |
| by weight (containing mineral spirits | |
| as a solvent)] | |
| Purified water | 24.8 parts by weight |
| Propylene glycol | 21.3 parts by weight |
| Glycerin | 3 parts by weight |
| Thickener | 30 parts by weight |
| 2% aqueous solution of "Rheozan" | |
| (brand name, manufactured by | |
| Sansho Co., Ltd.) | |
| Preservative | 0.15 part by weight |
| "Hokucide N100" (brand name, | |
| manufactured by Hokko Chemical | |
| Industry Co., Ltd.) | |
| Rust preventive: benzotriazole | 0.2 part by weight |
| Sequestering agent | 0.3 part by weight |
| "Zonon D" (brand name, manufactured | |
| by Daiichi Kagaku Yakuhin Co., Ltd.) | |
| 2-Amino-2-methyl-1-propanol | 0.15 part by weight |
| "AMP-90" (brand name, manufactured | |
| by ANGUS Chemical Company, Ltd.; | |
| containing about 10% of water) | |
| Acrylic emulsion | 6.5 parts by weight |
| "Johncryl J-390" (brand name, | |
| manufactured by Johnson Polymer Co., | |
| Ltd.; solid content: 46%; average | |
| particle diameter: 0.09 μm; minimum film- | |
| forming temperature: lower than 5° C.) | |
| Blue pigment toner | 0.6 part by weight |
| (aqueous toner dispersed with | |
| acryl resin, containing 15% of | |
| "C.I. Pigment Blue 15") | |
| Red pigment toner | 10 parts by weight |
| (aqueous toner dispersed with | |
| acryl resin, containing 15% of | |
| "C.I. Pigment Red 17") | |

The components other than the thickener out of the respective components described above were stirred and mixed for one hour by means of a labo mixer, and then the thickener prepared and neutralized in advance in the form of a 1% aqueous solution was added, followed by stirring and mixing again for one hour, whereby an ink having a viscosity of 3300 centipoises (E type viscometer, 1 rpm, 25° C.) was obtained.

Comparative Example 3

An ink was prepared in the same composition as in Example 3, except that purified water was substituted for the acrylic emulsion, whereby the ink having a viscosity of 3000 centipoises (E type viscometer, 1 rpm, 25° C.) was obtained.

Comparative Example 4

An ink was prepared in the same composition as in Example 4, except that purified water was substituted for the cross-linking type styrene-acryl emulsion, whereby the ink having a viscosity of 2700 centipoises (E type viscometer, 1 rpm, 25° C.) was obtained.

Comparative Example 5

An ink was prepared in the same composition as in Example 5, except that purified water was substituted for the cross-linking type styrene-acryl emulsion, whereby the ink having a viscosity of 2400 centipoises (E type viscometer, 1 rpm, 25° C.) was obtained.

Comparative Example 6

An ink was prepared in the same composition as in Example 6, except that purified water was substituted for the cross-linking type styrene-acryl emulsion, whereby the ink having a viscosity of 2900 centipoises (E type viscometer, 1 rpm, 25° C.) was obtained.

Comparative Example 7

An ink was prepared in the same composition as in Example 6, except that the amount of the acrylic emulsion used in Example 6 was increased to 15 parts by weight, and the purified water was decreased in an amount by the increment, whereby the ink having a viscosity of 3400 centipoises (E type viscometer, 1 rpm, 25° C.) was obtained.

The writing performances of the water based pigment inks obtained in Examples 3 to 6 and Comparative Examples 3 to 7 were tested by the following method.

The respective inks were charged into polypropylene holder refills (UMR-5) of ballpoint pens UM-100 manufactured by MITSUBISHI PENCIL CO., LTD. to produce ballpoint pens A for evaluation through a prescribed assembly procedure.

A 0.7 mm ball tip was used for the pen tip, and the pen tip obtained by enlarging the respective clearances of the ball, the holder and the channel for a high viscosity was used.

A part of ballpoint pens A for evaluation was left lying horizontally in a cap-off condition for a week in an air-conditioned chamber of a temperature of 25° C. and a humidity of 65%. The samples obtained after having been left for a week were designated as ballpoint pens B for evaluation.

With respect to the conditions for a writing performance test, ballpoint pens A for evaluation described above were used for writing on a coated paper (non-absorbent paper) and a black simili paper (absorbent paper), and ballpoint pens B for evaluation were used for drawing 100 spiral lines having a diameter of about 3 cm by handwriting on a black simili paper (absorpbent paper) at a writing angle of about 60°.

The writing performances of the drawn lines were evaluated according to the following criteria:
Evaluation ①: writing test with ballpoint pens A for evaluation;
The whole drawn line conditions were evaluated with eyes after drying the drawn lines.

○: beautiful colored metallic color

●: a lot of color turned pale and slightly thin colored metallic color

Δ: silver color observed partially

▲: considerably close to silver color

X: almost silver color

Evaluation ②: writing test with ballpoint pens B for evaluation and an aging stability test in leaving the pens lying with the cap off;

comparison with ballpoint pens A for evaluation

○: same drawn lines as with ballpoint pens A for evaluation (initial)

Δ: starving of the drawn lines and a reduction in the discharging amount take place in initial writing but the discharging amount recovers as writing is continued ▲: drawn lines become starved and the discharging amount is reduced X: impossible to write The test results are shown in Table 2.

TABLE 2

| | Writing performance | | |
| --- | --- | --- | --- |
| | Evaluation ① | | Evaluation ② |
| | Coated paper (non-absorbent paper) | Black simili paper (absorbent paper) | Black simili paper (absorbent paper) |
| Example 3 | ○ | ○ | ○ |
| Example 4 | ○ | ○ | ○ |
| Example 5 | ○ | ● | ○ |
| Example 6 | ○ | ○ | Δ |
| Comparative Example 3 | ○ | ▲ | ○ |
| Comparative Example 4 | ○ | X | ○ |
| Comparative Example 5 | ○ | X | ○ |
| Comparative Example 6 | ○ | X | ○ |
| Comparative Example 7 | ○ | ○ | X |

Results of Evaluation ①

It can be found from the results of Examples 3, 4 and 6 that beautiful colored metallic colors are revealed on a black simili paper which is an absorbent paper as well as on a coated paper which is a non-absorbent paper by adding the resin emulsions. In Example 5, the resin emulsion has a particle diameter which deviates from a suitable range, and therefore the results thereof are a little inferior to the results obtained in the other examples. In contrast with this, it can be found that since the inks prepared in Comparative Examples 3 to 6 do not contain the resin emulsions, the pigments of colorants are liable to settle before drying the drawn lines, and therefore the drawn lines are close to or scarcely different from the silver drawn lines.

Results of Evaluation ②

The inks prepared in Examples 3 to 5 and Comparative Examples 3 to 6 contain the resin emulsions having no film forming ability at room temperature or do not contain the resin emulsions, and therefore the ballpoint pens obtained after having been left lying with the cap off can draw lines which are not different from those drawn with the samples (ballpoint pens A) before being left lying. It can be found that the ink prepared in Example 6 has a lower film-forming temperature than room temperature and therefore is inferior in a writing performance after stored with the cap off as compared with the other inks.

In Comparative Example 7, while the drawn lines have a good color developability on an absorbent paper, inferior writing is brought about by dry up at the pen tip due to the film-forming ability of the emulsion contained in a large amount.

Industrial Applicability

The water based ink having a metallic lustrous color for a ballpoint pen according to the present invention uses an aluminum paste prepared by wetting aluminum powder in advance with at least one solvent selected from glycol ethers and glycols, so that the dispersibility of the aluminum powder is improved because this solvent is freely miscible with water which is the principal solvent. Accordingly, the aluminum powder is evenly dispersed in an ink vehicle containing the thickener and the other components, and splitting is prevented. In addition, the ink suitably flows out from the pen tip of a ballpoint pen, and the good writing performance is shown.

Further, the resin emulsion in the water based pigment ink having a metallic lustrous color for a ballpoint pen according to the present invention is charged into the inside of paper fibers to prevent as a filling the color pigment from settling. As a result, the effect that a beautiful colored lustrous color (metallic color) is revealed is exhibited as is the case with writing on a paper face which scarcely absorbs an ink, such as a coated paper.

What is claimed is:

1. A water based ink having a metallic lustrous color for a ballpoint pen comprising a thickener, a water-soluble organic solvent, water and an aluminum paste prepared by wetting aluminum powder in advance with at least one solvent selected from the group consisting of glycol ethers and glycols.

2. The water based ink having a metallic lustrous color for a ballpoint pen as described in claim 1, wherein said glycol ether is propylene glycol monomethyl ether.

3. The water based ink having a metallic lustrous color for a ballpoint pen as described in claim 1, wherein said glycol is butylene glycol or propylene glycol.

4. The water based ink having a metallic lustrous color for a ballpoint pen as described in claim 1, wherein the content of said aluminum paste in the ink is 1 to 15% by weight based on the whole amount of the ink in terms of an amount converted to powder.

5. The water based ink having a metallic lustrous color for a ballpoint pen as described in claim 1, wherein the content of said thickener in the ink is 0.4 to 1.0% by weight based on the whole amount of the ink.

6. A water based pigment ink having a metallic lustrous color for a ballpoint pen comprising aluminum powder, a water-soluble organic solvent, a pigment, a thickener and a resin emulsion.

7. The water based pigment ink having a metallic lustrous color for a ballpoint pen as described in claim 6, wherein said resin emulsion has an average particle diameter of 0.03 to 0.6 µm.

8. The water based pigment ink having a metallic lustrous color for a ballpoint pen as described in claim 6, wherein said resin emulsion has no film-forming property at room temperature.

9. The water based pigment ink having a metallic lustrous color for a ballpoint pen as described in claim 7, wherein said resin emulsion has no film-forming property at room temperature.

10. The water based pigment ink having a metallic lustrous color for a ballpoint pen as described in claim 8, wherein the content of said resin emulsion in the ink is 1 to 10% by weight based on the whole amount of the ink in terms of a solid content.

11. The water based pigment ink having a metallic lustrous color for a ballpoint pen as described in claim 10, wherein the content of said resin emulsion in the ink is 1 to 10% by weight based on the whole amount of the ink in terms of a solid content.

12. The water based pigment ink having a metallic lustrous color for a ballpoint pen as described in claim 7, wherein said resin emulsion has a lowest film-forming temperature of 40° C. or higher.

13. The water based pigment ink having a metallic lustrous color for a ballpoint pen as described in claim 6, wherein said resin emulsion has a lowest film-forming temperature of 40° C. or higher.

14. The water based pigment ink having a metallic lustrous color for a ballpoint pen as described in claim 9, wherein said resin emulsion has a lowest film-forming temperature of 40° C. or higher.

15. The water based pigment ink having a metallic lustrous color for a ballpoint pen as described in claim 10, wherein said resin emulsion has a lowest film-forming temperature of 40° C. or higher.

16. The water based pigment ink having a metallic lustrous color for a ballpoint pen as described in claim 11, wherein said resin emulsion has a lowest film-forming temperature of 40° C. or higher.

17. The water based pigment ink having a metallic lustrous color for a ballpoint pen as described in claim 6, wherein said aluminum powder is wetted with at least one solvent selected from the group consisting of glycol ethers and glycols.

18. The water based pigment ink having a metallic lustrous color for a ballpoint pen as described in claim 6, wherein the content of said thickener in the ink is 0.4 to 1.0% by weight based on the whole amount of the ink.

19. The water based pigment ink having a metallic lustrous color for a ballpoint pen as described in claim 6, wherein the content of said water-soluble organic solvent in the ink is 5 to 40% by weight based on the whole amount of the ink.

20. The water based pigment ink having a metallic lustrous color for a ballpoint pen as described in claim 6, wherein said pigment has an average particle diameter of 0.03 to 0.3 $\mu$m.

21. The water based pigment ink having a metallic lustrous color for a ballpoint pen as described in claim 6, wherein the content of said pigment in the ink is 0.5 to 15% by weight based on the whole amount of the ink.

22. The water based pigment ink having a metallic lustrous color for a ballpoint pen as described in claim 20, wherein the content of said pigment in the ink is 0.5 to 15% by weight based on the whole amount of the ink.

\* \* \* \* \*